United States Patent [19]
Ball et al.

[11] Patent Number: 5,212,536
[45] Date of Patent: May 18, 1993

[54] FRESNEL LENS BASED SPECTROSCOPIC DETECTOR

[75] Inventors: Gary A. Ball, Newington; Richard A. Meinzer, Glastonbury, both of Conn.

[73] Assignee: United Technologies Corporation, Hartford, Conn.

[21] Appl. No.: 716,873

[22] Filed: Jun. 18, 1991

[51] Int. Cl.[5] .................................................. G01J 3/00
[52] U.S. Cl. .................................................. 356/300
[58] Field of Search ................ 356/300, 375, 331–334; 355/20

[56] References Cited

U.S. PATENT DOCUMENTS 4,039,825 8/1977 Doyle .................................. 356/376
4,829,339 5/1989 Dwyer .................................. 355/20

OTHER PUBLICATIONS

"Fresnel Diffraction", Fundamentals of Optics, by F. A. Jenkins, 1965.
"Coherent Laser Beam Addition: An Application of Binary-Optics Technology", The Lincoln Laboratory Journal, by F. R. Leger, M. Holz, G. J. Swanson and W. B. Veldkamp, Fall 1988, vol. 1, No. 2.

Primary Examiner—Richard A. Rosenberger
Assistant Examiner—K. P. Hantis
Attorney, Agent, or Firm—Eric W. Petraske; Gerald L. DePardo

[57] ABSTRACT

A detector for laser radiation that detects the presence of above-threshold radiation in one of a set of wavelength ranges employs a set of Fresnel lenses designed to focus radiation in a particular band onto a metal-coated film. A series of Fresnel lenses is designed with constant focal lengths, but each lens is designed to have that focal length at a specific wavelength. Only when the wavelength of the incident radiation matches the design wavelength of the Fresnel lens will the film be marked or machined. Radiation of differing wavelengths will be defocused to a degree that will reduce the intensity below the level that will mark or machine the film. An electronic based version of this spectroscopy detector can also be implemented.

9 Claims, 11 Drawing Sheets fig.1a fig.1b fig.1c fig. 1d fig. 2 fig.3 fig.4 fig.5 fig. 6 fig. 7 fig. 8 fig.9 fig.10 fig.11a fig.11b fig. 12

FRESNEL LENS BASED SPECTROSCOPIC DETECTOR

The Government has rights in the invention pursuant to Contract F33615-88-C-5488 awarded by the Department of the Air Force.

CROSS REFERENCE TO RELATED APPLICATIONS

This application is related to the subject matter disclosed and claimed in copending U.S. Ser. No. 07/717,382 entitled Method for Making a Large Optically Flat Membrane by Richard P. Muth and Richard A. Meinzer filed on even date herewith and assigned to the same assignee herein incorporated by reference.

TECHNICAL FIELD

The field of the invention is that of detecting laser radiation at different wavelengths and identifying the wavelengths of the illuminating radiation.

BACKGROUND ART

In the field of detecting radiation of different wavelengths, generally known as spectroscopy, it is conventional to use a dispersive element such as a diffraction grating, that disperses the radiation transversely to the direction of propagation. A straight forward approach to the problem of detecting the wavelength of incident radiation would be to use a diffraction grating and a set of photoelectric detectors placed at transverse locations corresponding to the commonly used laser wavelengths. Such an approach would certainly work, but it has the drawbacks of taking up a substantial amount of space and having the need to use electronic elements, with the associated requirement of a power supply.

The problem addressed by this invention is that of producing a compact optical spectroscopic detector that does not need electronics and can be read quickly by inspection to identify the wavelengths of the illuminating radiation.

DISCLOSURE OF INVENTION

The invention relates to a compact, passive nonelectronic, or active optical spectroscopic detector in which illuminating radiation strikes a set of Fresnel lenses having a common focal length. Each lens is designed to have the same focal length for its design wavelength. Wavelength dispersion causes radiation in an illuminating beam to be focused at separated locations along the direction of travel for each lens. Radiation at the design wavelength for a particular lens will mark a film positioned at the common focal length and radiation having a different wavelength will be defocused and not mark the film. The lens aperture and focal length are chosen together with the properties of a detecting film located at the focal spot of the radiation such that radiation of the desired wavelength exceeding a threshold intensity level will burn a hole or mark the film and radiation having wavelengths different from the chosen wavelengths will not mark the film.

Other features and advantages will be apparent from the specification and claims and from the accompanying drawings which illustrate an embodiment of the invention.

BEST MODE FOR CARRYING OUT THE INVENTION

Figures 1A, 1B:
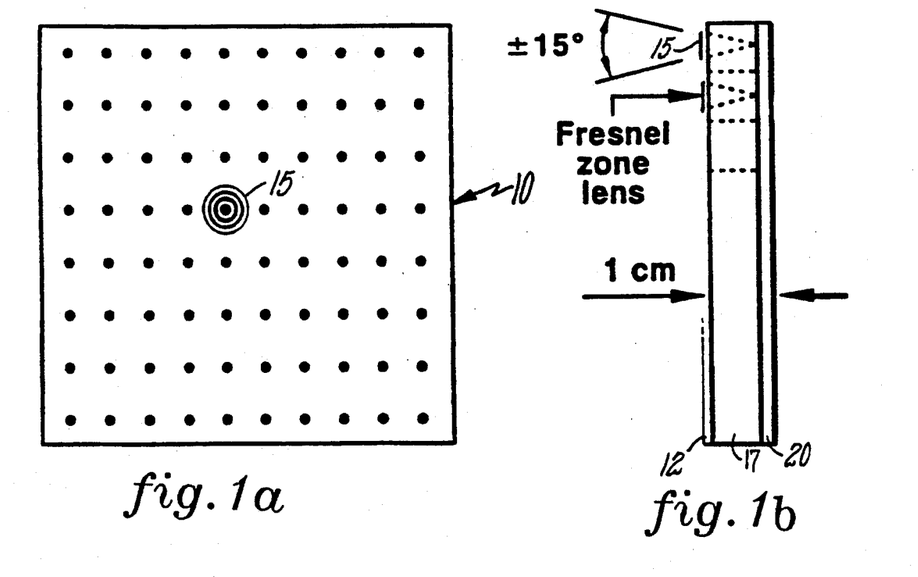
FIGS. 1a-1d illustrate schematically front and side views of an embodiment of the invention.
Figure 1C:
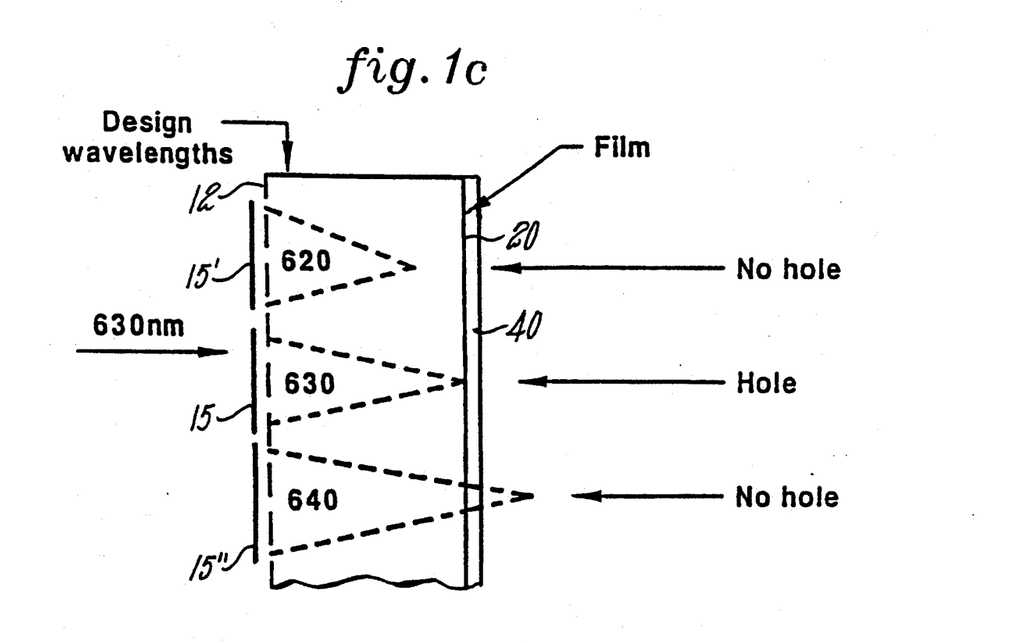

FIG. 1a illustrates a front view of an array of lenses 15 that focus optical radiation of different wavelengths on a detecting film according to the invention. FIG. 1b illustrates a side view of the embodiment of FIG. 1a, showing the glass front plate 12 of the device which contains the array of Fresnel lenses and the film 20 positioned at the focal plane of lenses 15 in this embodiment. Incident radiation illuminates plate 12, and is focused sharply onto film 20 when the incident wavelength matches the design wavelength of the lens. When the incident radiation differs from the design wavelength, it will be not be focused to its maximum intensity at the film plane and will not burn a hole or mark the film. FIG. 1c illustrates the operation of the device for an incident wavelength of 630 nm. Radiation entering lens 15, designed for 630 nm, is focused correctly. Radiation entering lens 15' and 15", designed for 620 nm and 640 nm, respectively, are focused before and after the film.

Figure 1D:
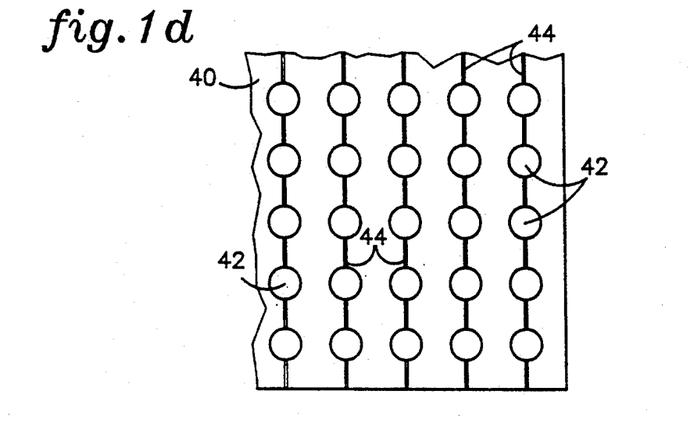
Figure 2:
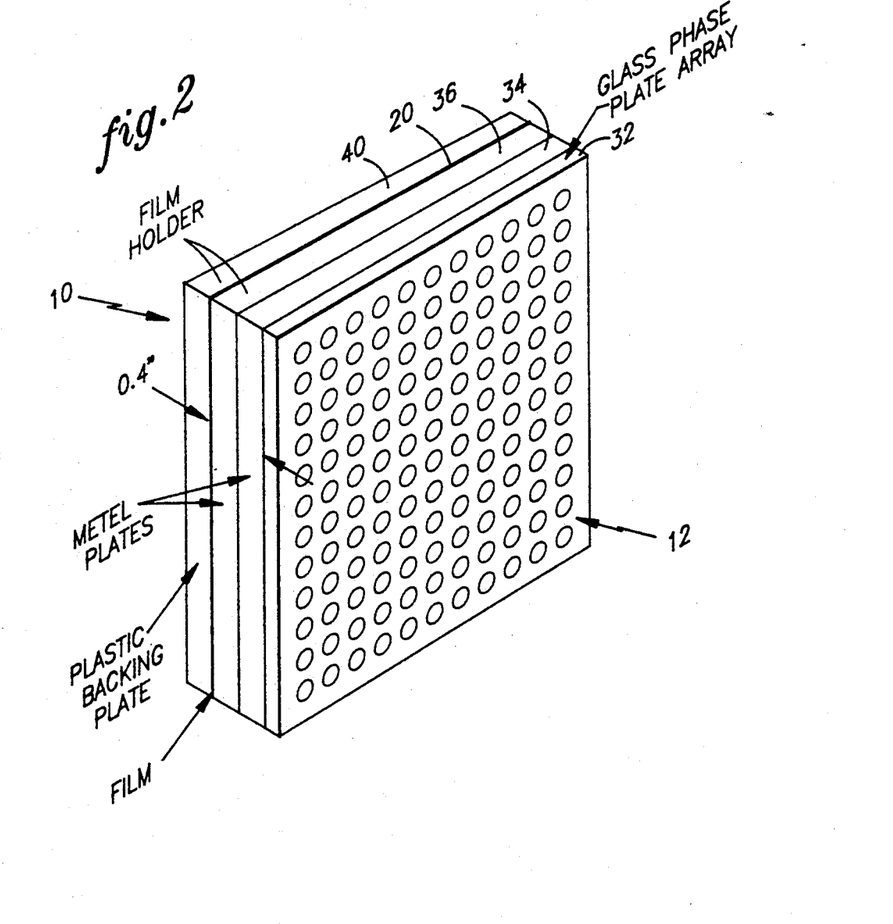
FIG. 2 illustrates in perspective an embodiment of the invention showing more detail.

Referring now to FIG. 2, there is shown a perspective view of the embodiment of FIG. 1 in more detail showing device 10 with glass plate 12 machined to hold a set of Fresnel lenses having a common diameter of 5 mm. Standard photolithography techniques were used to etch the phase plates that were used as the Fresnel lenses to the correct thicknesses. This particular embodiment contains an array of 81 lenses, though those skilled in the art will readily be able to devise arrays suitable for their needs. The front plate 12 is spaced apart from back surface 20 by two spacing plates 34 and 36. These plates are illustratively machined from Invar, a commercially available material having a low coefficient of expansion. Both Invar plates included a set of holes to permit the passage of the radiation, with the remaining web of metal lending stiffness in order to maintain a more uniform distance between the front surface 12 and the back film 20.

Film 20 is braced by a back plate 40, which may be any convenient form and made from any convenient material, such as Lucite. The plates may be held together by any convenient method, such as clamping, or by fastening together with screws or other fasteners. In some cases, it may be practical to use a monolithic structure in which lenses 15 are machined into a solid slab of material 17, with film 20 being coated on the back face. The condition would be that material 17 be transparent in the frequency range of interest, so that the material is not affected by the passage of concentrated radiation through it.

It is important for the operation of the invention that the spacing distance between the front and back surfaces, 12 and 20, be maintained at the correct distance because the dispersion depends on the film 20 being located at a nominal distance from front plate 12. The larger the size of the device, the more difficulty there will be in maintaining the spacing. Those skilled in the art will readily be able to devise any number of bracing schemes in order to make the total array suitably rigid to hold the film in place Film 20 may be held to back plate 40 by any convenient manner, such as glue, or mechanical pressure.

Referring to FIG. 1d, recesses 42 are machined into the front face of plate 40, so that there is no contact between film 20 and plate 40 at the focal spot. If there were contact, plate 40 would act as a heat sink, decreasing the sensitivity of the device. Additionally, a number of grooves 44 scratches of about 0.1 mm depth and width were made in the front surface of plate 40 to provide pressure relief. The air in the recesses described above expands and contracts with temperature change. If there is no path for pressure relief, the film will no longer be flat. The size and number of grooves is not critical. Alternatively, film 20 may be slit or made from a porous material.

Referring now to Table 1, there is illustrated a set of relevant parameters for a set of wavelengths ranging from 400 nm to 1100 nm and covering a set of four wavelengths of commonly used lasers. The first column in the table gives the nominal wavelength for which the lens is designed. The second column, $r_1$, is the radius of the first Fresnel zone. The third column, D, is the diameter of the lens, which is set to 5 mm in this case. The fourth column, f, is the focal length of the lens which is set to 10 mm in this case. The next column $dq/d\lambda$ represents the dispersive power of this lens. The next column, $Z_r$, represents the Rayleigh distance, which is a conventional parameter indicating the depth of focus. The next column, dq, contains a distance from the beam waist for which the incident intensity is reduced by a factor of ten. This column represents the dispersive power of the lens, in that an incident beam that just satisfies the threshold requirement of marking or burning a hole when it is focused at the nominal distance will not do so when the intensity is reduced by a factor of 10. As will be discussed below, one preferred method of detecting wavelengths is to arrange groups of three lenses, one at the nominal length and one at a higher, longer and shorter wavelength. The last column, $d\lambda$, represents the change in wavelength that will reduce the power at the focal spot by a factor of 10. This column is a measure of the spectral sensitivity of the device. It can be seen that the entries in this column are about 2 nm so that the device is readily able to resolve laser radiation of different wavelengths.

An important condition on a successful device is that it not give false readings; i.e., the film shall not be marked or machined by exposure to sunlight or other illumination. Averaging the sun's maximum irradiance values for sea level and space gives an average value of 0.22 w/cm$^2$ $\mu$. As shown in the right hand column of Table 1, the device has an average resolution of about 2 nm and consequently will not be effected by exposure to sunlight because the irradiance in a 2 nm portion of the solar spectrum is too low to exceed the damage threshold. Use of sunlight as a reference is not essential. Other applications may find it convenient to use a different reference.

The spectral dispersion $dq/d\lambda$ equals $r^2/m\lambda^2$ where r is the radius of the zone plate, m is the zone index of refraction, and $\lambda$ is the wavelength of interest. Since zone plates are inefficient, it is convenient to use phase plates, which are specialized forms of zone plates in which all of the zones are transparent and are etched to a different thickness such that the phase of the radiation passing through the zone plate is changed in each zone so that a focus is achieved. All of these will be referred to generally as Fresnel lenses herein for convenience. Operation of a zone plate, which has an efficiency of about 10% is described in Jenkins and White *Fundamentals of Optics*, McGraw-Hill Book Company Inc., N.Y. (1957). Phase plates, as shown in Leger, et al, *The Lincoln Laboratory Journal* 1,225 (1988), can have efficiencies approaching 100%. With four etching steps a 16 level phase plate having 16 different thicknesses would have a theoretical efficiency of 99%. Standard photolithographic techniques were used to form a set of two-step phase plates for the illustrated embodiment.

The term "damage threshold" will be used herein to cover an intensity that will produce a visible mark on the film. An intensity less than some threshold amount will not mark the film even if it lasts indefinitely because the film will dissipate heat faster than the radiation adds further heat, so that the temperature of the film does not rise. This phenomenon is used in order to design the device to discriminate against sunlight.

Figure 5:
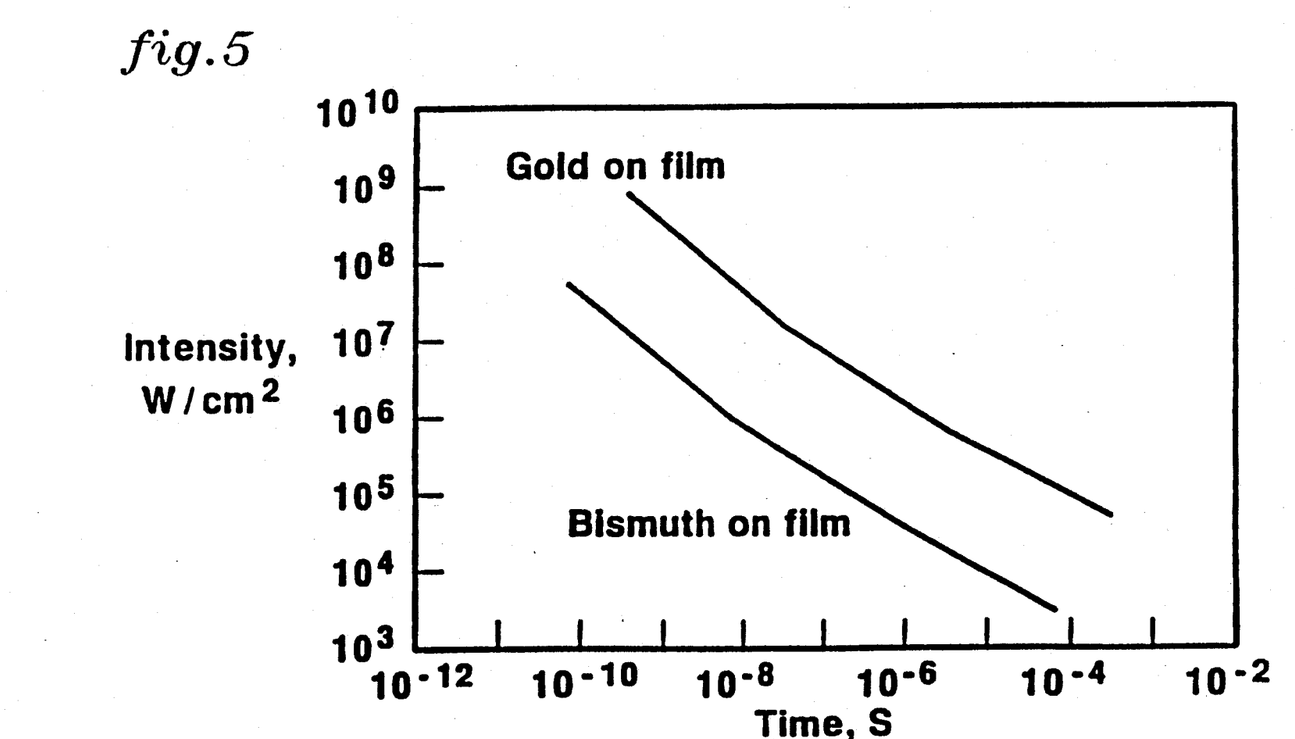
FIG. 5 is a graph showing the relationship between incident intensity and the exposure time required to burn a hole through a film.

For purposes of designing a lens set, some assumptions must be made about the dwell time that radiation will be illuminating the detector. The device will be designed so that a minimum threshold intensity for a corresponding dwell time will mark the film. FIG. 5 illustrates the connection between time and intensity required to exceed the damage threshold. Intensities greater than the minimum will be detected even if they have a lesser dwell time than that for the minimum dwell time, provided that they exceed the damage threshold dwell time, which is defined as the time required for radiation of that intensity to exceed the damage threshold. In the case of a laboratory environment, where the duration of exposure can be as long as desired, the minimum intensity will be set by either background illumination or by the rate at which the film radiates energy to the environment (the amount of illuminating power that will cause a temperature rise). In the case of a mobile platform, some assumptions must be made about the speed of the platform and the rate of travel of the illuminating beam. If the platform travels at 200 m/s and the illuminating beam is assumed to have a diameter of 1 m, the dwell time for a stationary beam is 5 ms, and only intensities that will exceed the damage threshold for that dwell time will be detected.

The amount of power reaching the film depends on the diameter of the lens, but that diameter is not a free parameter. It can be shown that the focal spot diameter and the Rayleigh range ($Z_r = \pi\lambda(f/D)^2$) depends on the phase plate diameter and wavelength. Spectral discrimination is also dependent on the amount of power permitted to enter the lens. The depth of field ($2Z_r$) must be maintained sufficiently large, about 10 microns, that alignment tolerance in assembly will not move the film out of the beam waist. If so, the sensitivity of the detector would be degraded.

Figure 3:
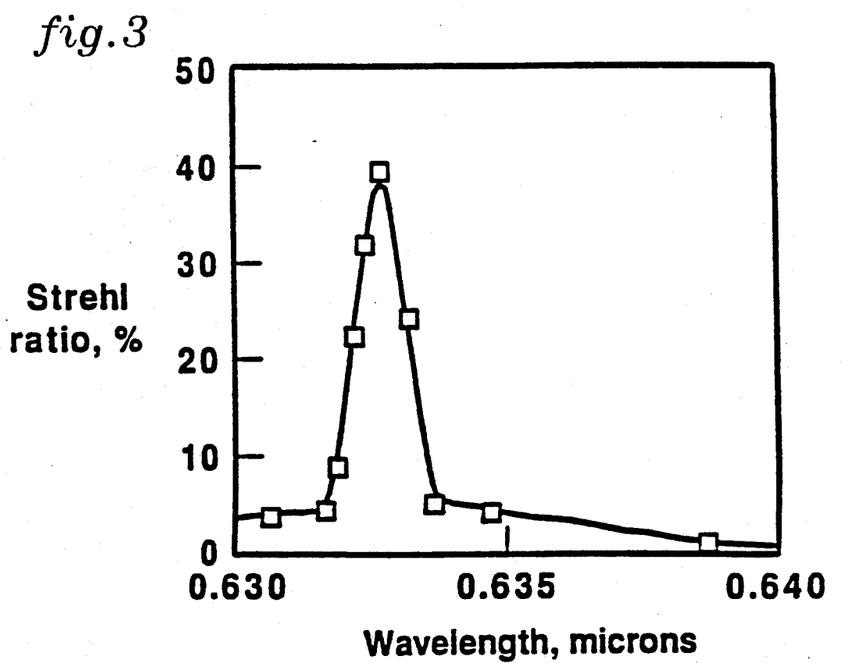
FIG. 3 illustrates a parameter of the optical design for a wavelength in the visible range.
Figure 4:
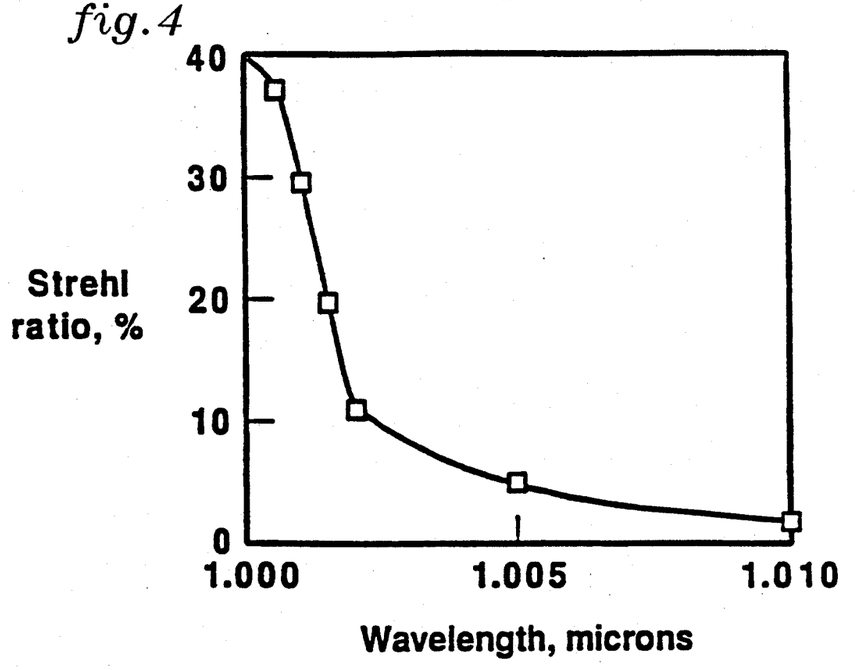
FIG. 4 illustrates the same parameter for a wavelength in the infrared range.

The Strehl ratio (actual peak intensity/peak intensity for perfect optical elements) can be computed as a function of wavelength. FIG. 3 shows this calculation for a nominal wavelength of 630 nm, the helium neon laser length, and FIG. 4 illustrates the same calculation for the vicinity of 1 micron, for $Nd^{3+}$+YAG lasers. It can be seen from these calculations that the spectroscopic discrimination of the Fresnel zone plates is very good.

Figure 6:
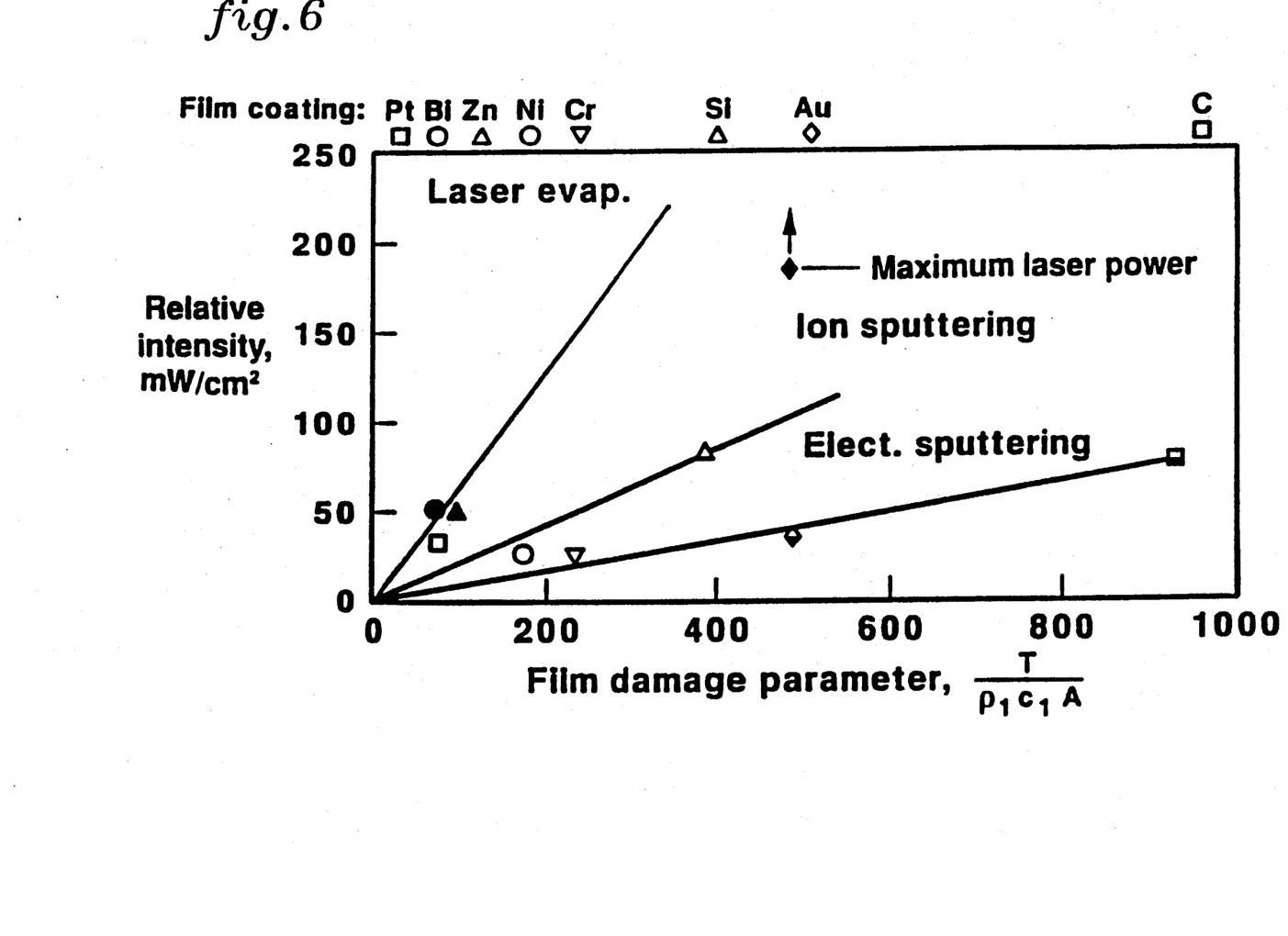
FIGS. 6 and 7 illustrate comparisons of intensity versus a parameter for machining holes and marking detecting films, respectively.
Figure 7:
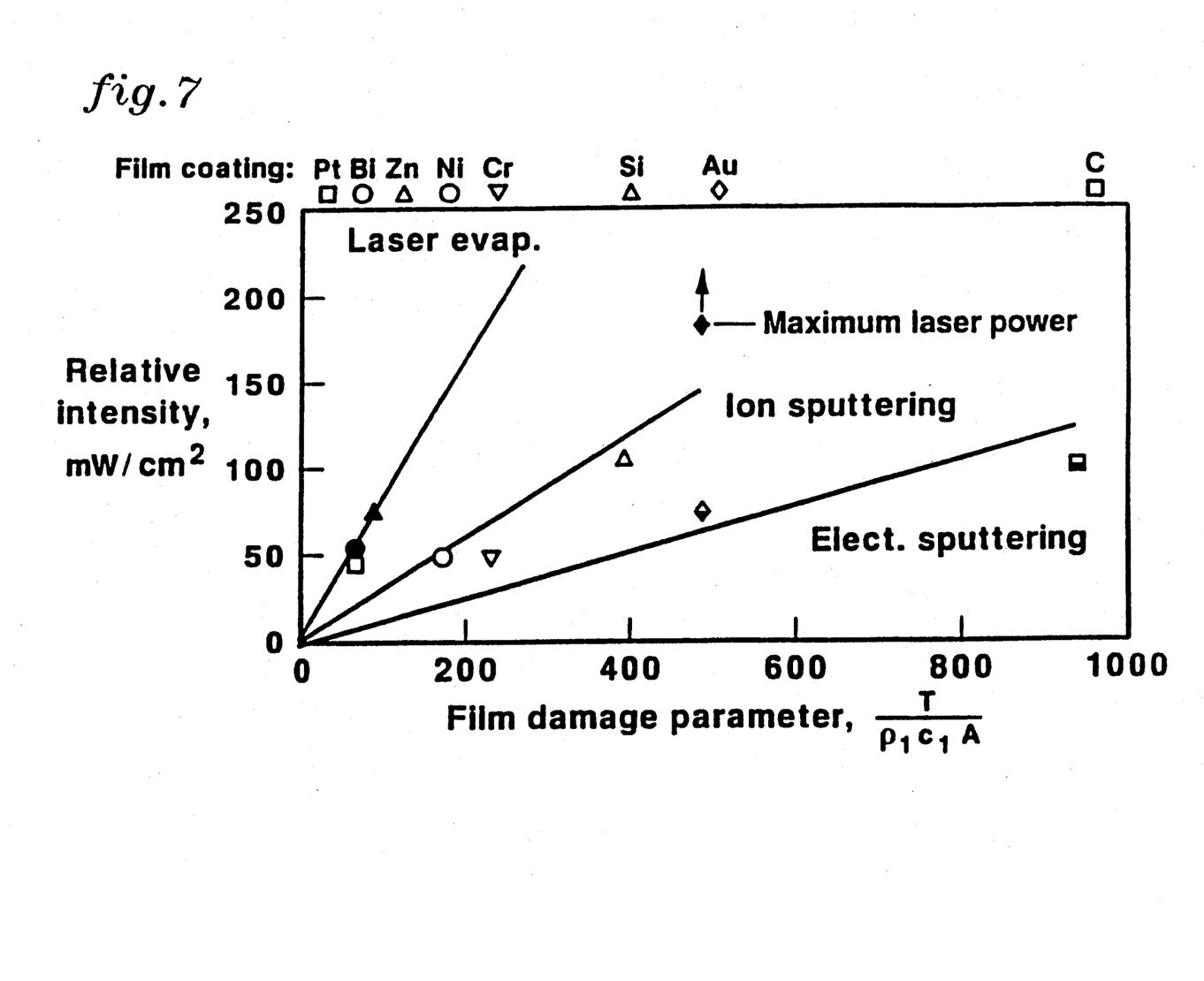

Once the incident radiation has been focused to a spot, the effect of that radiation will depend on the parameters of the film that the radiation strikes. Relevant parameters are the type of metal coating, the thickness of that coating, the type of plastic film supporting the coating, and the type of plastic. Tables II and III give relevant parameters for metal and plastic. Burnthrough time requirements for sample films are given in FIG. 5 comparing the intensity versus the exposure time. Similar data for machining holes in coated films are illustrated in FIG. 6 and for marking coating films are illustrated in FIG. 7. The substrate is a nominal 10 $\mu m$ layer of vinylidene chloride plastic (used in Saran Wrap). Three curves are drawn through the data points to indicate the classification of the points on the basis of the metal film formation: laser evaporation, ion sputtering, and electron sputtering.

It is interesting that a comparison of the two Figures shows that there is relatively little intensity difference between marking the film and machining a hole in it. In both cases, the data are clustered about 50 mW/cm$^2$. This indicates that the device will be relatively insensitive to the incident power, an advantage since the incident power will vary by a considerable amount.

Figure 8:
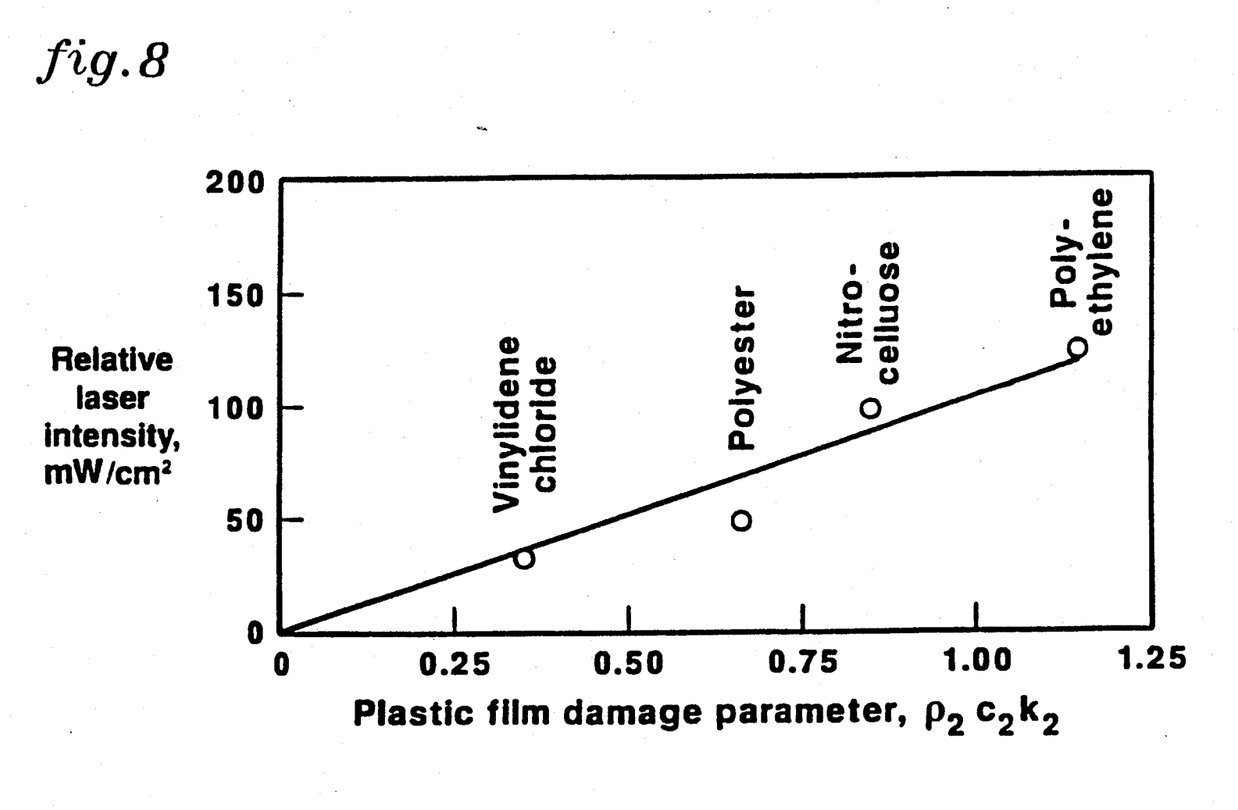
FIG. 8 illustrates a comparison of power and film damage for different films

Referring now to FIG. 8, there is shown a curve giving the intensity versus a film damage parameter for different films. This shows the expected linear dependence on the type of film. Table 2 shows pertinent data for different metals. The last column shows a measure of susceptibility to damage, calculated as indicated.

Figure 9:
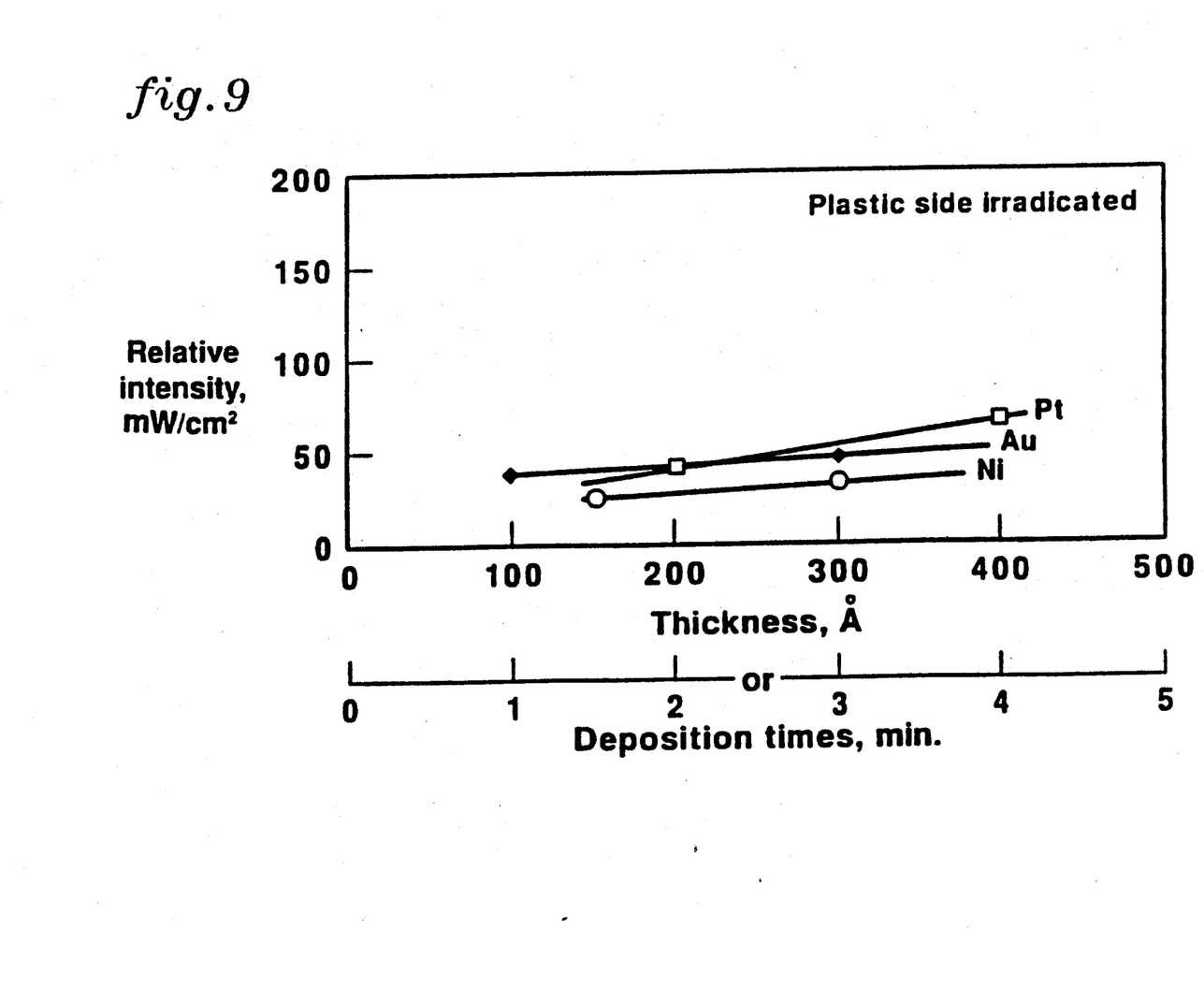
FIG. 9 illustrates the dependence of laser intensity on metal film thickness.

Referring now to FIG. 9, there is shown a power versus thickness curve for different thicknesses of different metals, Pt, Pu, Ni. Only the platinum curve shows the expected dependence of power on thickness. The curves for gold and nickel are substantially flat. This is a further advantage for the device, in that it indicates that the device will be relatively insensitive to variations in the film thickness. Table 3 shows pertinent data for different plastics. The last column shows a measure of susceptibility to damage, calculated as indicated.

Figure 10:
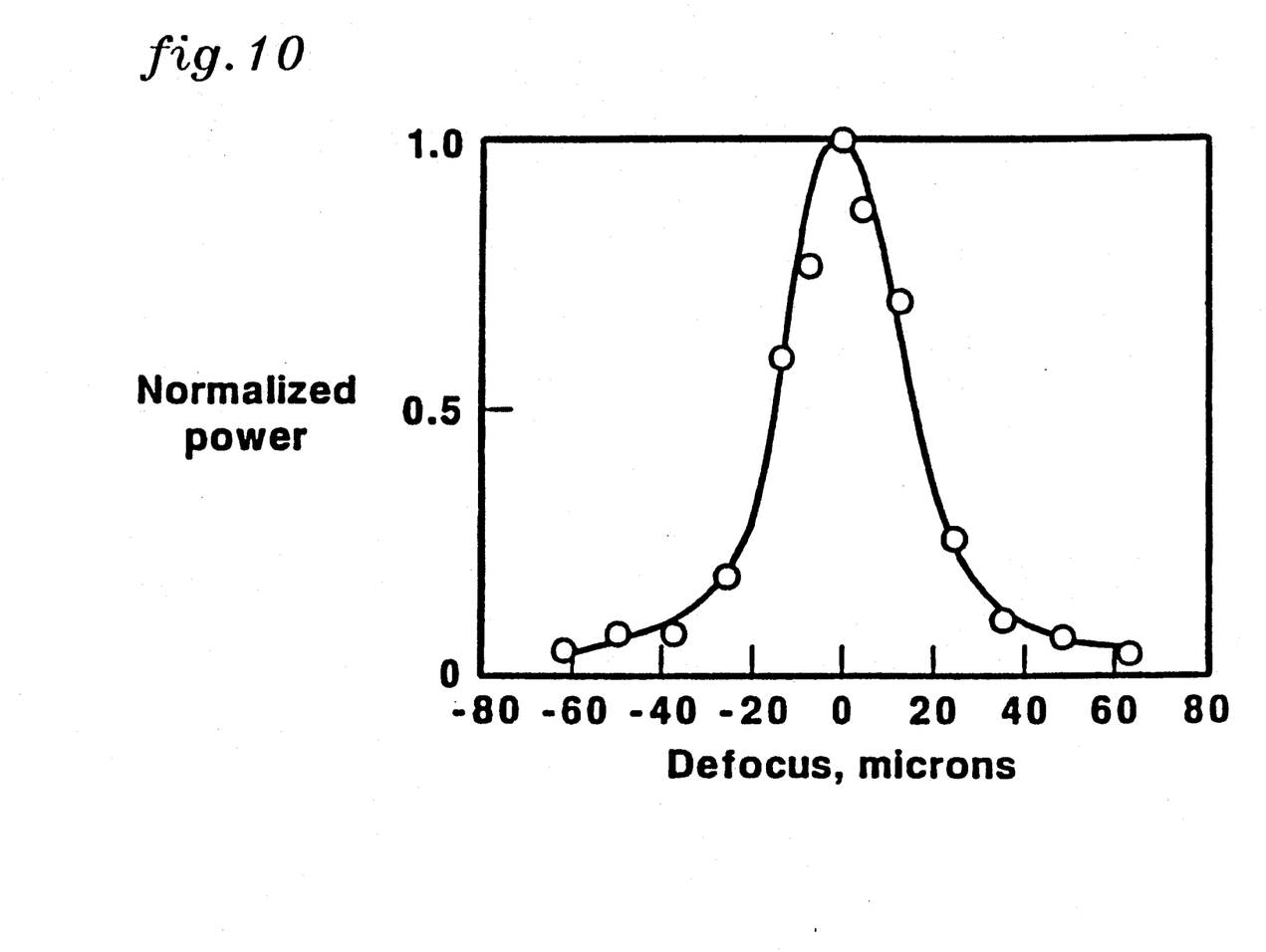
FIG. 10 illustrates measured data on the depth of focus of a lens used together with the invention.
Figure 11A:
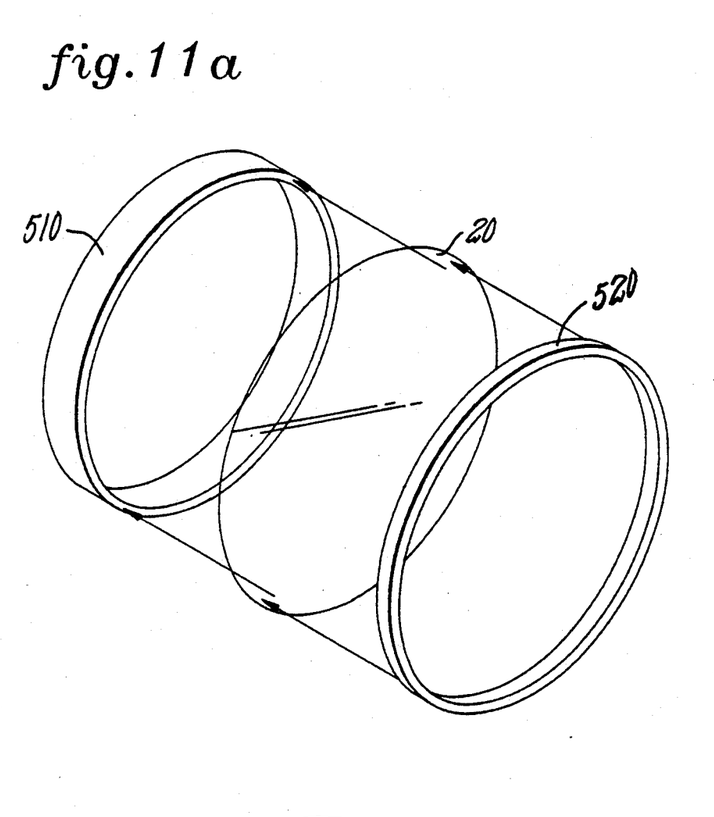
FIGS. 11a-b illustrates an apparatus for stretching the detecting film.
Figure 11B:
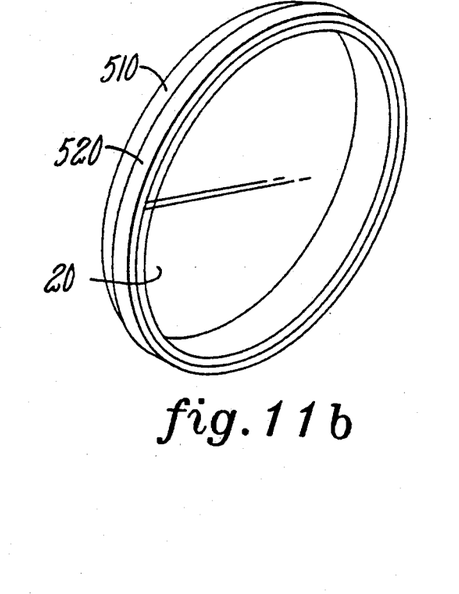

FIG. 10, shows data points giving the power measured in a spot of varying size. The horizontal axis illustrates the defocus, i.e., the intensity that is measured as the detector is moved back and forth along the Z axis, the axis along which the radiation is travelling. It indicates that substantially all the power is found within a range of plus or minus 20 microns. These data and those for FIG. 9 were taken with a lens having a 1 cm focal length and a diameter of 5 mm, for radiation of wavelength 633 nm. This curve indicates the limits of tolerance in position of film 20. If the film is off by more than 20 microns it will be unmarked or marked only very lightly and will give a false reading Referring back to FIG. 1, the front glass plate and the first Invar plate form the front portion of a "camera", and the sandwich comprising the second Invar plate, the film and the plastic backing plate form a film holder. Both Invar plates included a set of holes to permit the passage of the radiation, with the remaining web of metal lending stiffness. The film was stretched by a device shown in exploded form in FIG. 11a and in assembled form in FIG. 11b, in which film 505 is stretched manually over support 510, after which stretching ring 520 is slid down over the outside of support 510 as indicated by the phantom lines. The film was heated lightly by a heat gun for a period of a few minutes. The heat both stretches and flattens the plastic. Interferometric measurements showed that the final film was flat to two microns. Vinylidene chloride was the only material in Table 3 that exhibited this property. The film 20 was placed between the second Invar plate 36 and backing plate 40 which were then fastened together by screws or any other convenient means.

Figure 12:
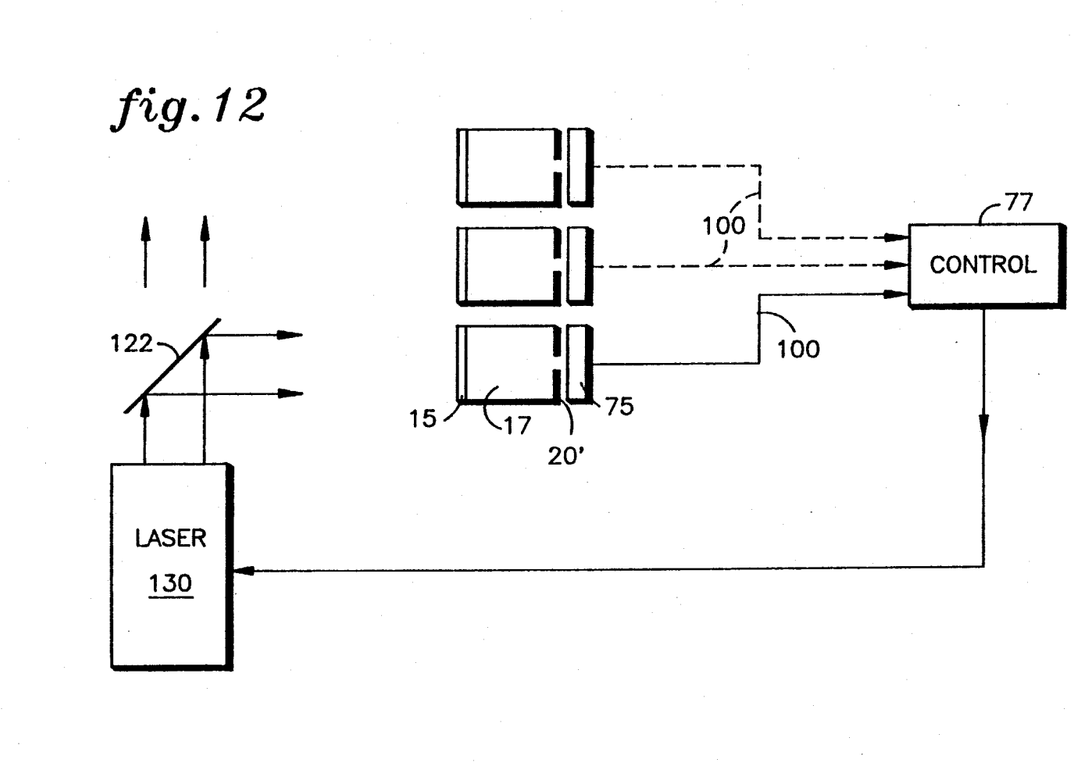
FIG. 12 illustrates an alternative embodiment of the invention.

Referring now to FIG. 12, there is shown a portion of an alternative embodiment of the invention, in which one of the lenses 15 is positioned on the left, separated from film 20' by spacer 17. Film 20' has a hole (or aperture) machined in it by exposure to above-threshold radiation, photolithography, or any other means thereby creating a spatial aperture. Behind film 20', photodetector 75 responds to light that passes through the aperture in film 20', directing a signal to controller 77. Controller 77 may be a conventional digital computer and associated circuits or an assembly of special purpose circuits that responds to a signal magnitude above some predetermined damage threshold value. Any convenient discriminant may be used, such as the instantaneous signal or the integral of the signal over any convenient time. This embodiment retains most of the virtues of the nonelectronic embodiment as regards compactness and simplicity.

The addition of the detector electronics provides the ability to respond in real time as part of a control loop. For example, controller 77 may control the output wavelength and power of $CO_2$ laser 130 through a conventional electromechanical piezo control of a grating and cavity length to maintain the output on a desired line. A sub-beam is tapped off by beamsplitter 122 for the detector, with the remaining beam exiting for whatever application is desired. Controller 77 may also respond to a two- or three lens-aperture-detector unit arrangement such as that shown in FIG. 1c to provide signals on dotted lines 100 in FIG. 12 indicating whether the beam is above or below the correct wavelength. A simple comparison of the relative signal strengths will serve as the discriminant. Alternatively, instead of having separate units, the device may employ a lens array and an aperture array (like in FIG. 1c) along with a photodetector array, one photodetector for each lens/aperture pair.

It should be understood that the invention is not limited to the particular embodiments shown and described herein, but that various changes and modifications may be made without departing from the spirit and scope of this novel concept as defined by the following claims.

TABLE 1

WAVELENGTH (dλ) AND IMAGE DISTANCE (dq) CHANGES CORRESPONDING TO A FACTOR OF 10 REDUCTION IN BREAK INTENSITY

| λ mm | $r_1$ mm | D mm | $\frac{f}{\frac{r^2}{m\lambda}}m$ (mm) | $\frac{dq}{d\lambda}$ $\frac{r^2}{m\lambda^2}$ | $Z_r$ microns | dq ($3 Z_r$) microns | dλ (nm) |
|---|---|---|---|---|---|---|---|
| 400 | 0.0632 | 5 | 10 | $2.5 \times 10^4$ | 5.0 | 15 | 0.6 |
| 633 | 0.0796 | 5 | 10 | $1.58 \times 10^4$ | 7.9 | 24 | 1.5 |
| 800 | 0.0894 | 5 | 10 | $1.25 \times 10^4$ | 10 | 30 | 2.4 |
| 1100 | 0.015 | 5 | 10 | $19.09 \times 10^3$ | 14 | 41 | 4.5 |

TABLE 2

METAL FILM PARAMETERS

| Metal | T (°C.) | $\rho_1$ (g/cc) | $c_1$ Cal/mole °C. | A | $\frac{T}{\rho_1 c_1 A}$ |
|---|---|---|---|---|---|
| Ag | 2212 | 10.50 | 6.07 | 0.012 | 3233 |
| Al | 2467 | 2.699 | 5.81 | 0.09 | 1941 |
| Cu | 2595 | 8.96 | 5.84 | 0.04 | 1370 |
| C | 3550 | 2.0 | 2.04 | 1.00 | 937 |
| Au | 2966 | 19.32 | 6.08 | 0.057 | 484 |
| Si | 2355 | 2.32 | 4.78 | 0.61 | 388 |
| Ti | 3260 | 4.5 | 5.97 | 0.43 | 306 |
| Cr | 2482 | 7.2 | 5.58 | 0.30 | 229 |
| Ge | 2830 | 5.35 | 5.59 | 0.53 | 196 |
| Co | 2900 | 8.9 | 5.93 | 0.33 | 182 |
| Ni | 2732 | 8.902 | 6.23 | 0.32 | 169 |
| Sn | 2270 | 5.75 | 6.30 | 0.58 | 121 |
| Sb | 1380 | 6.691 | 6.03 | 0.35 | 117 |
| Te | 5425 | 16.6 | 6.51 | 0.47 | 112 |
| Sa | 1140 | 3.5 | 6.30 | 0.6 | 107 |
| Zn | 907 | 7.133 | 6.07 | 0.31 | 87.9 |
| Pd | 2927 | 12.02 | 6.21 | 0.50 | 85.7 |
| Pb | 1744 | 11.35 | 6.32 | 0.36 | 78.1 |
| Bi | 1560 | 9.8 | 6.19 | 0.39 | 77.5 |
| Pt | 3827 | 22.5 | 6.24 | 0.41 | 71.2 |
| Se | 684.9 | 4.28 | 6.07 | 0.77 | 47.9 |
| $Cr_2O_3$ | 4000 | 5.21 | 28 | 0.73 | 40 |

TABLE 3

PLASTIC FILM PARAMETERS

| Plastic | $\rho_2$ (g/cc) | $c_1$ BTU/lb °F. | $k_2$ BTU/hr/ft²/°F. | $\rho_2 c_1 k_2$ |
|---|---|---|---|---|
| Polyaide | 1.43 | 0.27-0.31 | 2.50-6.80 | 1.90 |
| Polyethylene | 0.93 | 0.53-0.55 | 2.28 | 1.15 |
| Polytetra fluoroethylene | 2.10-2.30 | 0.25 | 1.68 | 0.92 |
| Nitrocellulose | 1.28 | 0.36 | 1.74 | 0.80 |
| Acetyls | 1.425 | 0.35 | 1.56 | 0.78 |
| Polyester | 1.31 | 0.36-0.55 | 1.10 | 0.66 |
| Alkyds | 1.32 | 0.30 | 1.46 | 0.58 |
| Polypropylene | 0.90-0.91 | 0.45 | 1.21-1.36 | 0.49 |
| Polycarbonate | 1.20 | 0.30 | 1.35 | 0.48 |
| Vinylidene chloride | 1.68-1.75 | 0.32 | 0.64 | 0.35 |
| Polystyrene | 1.04 | 0.30-0.35 | 0.70-1.08 | 0.28 |
| Phenolics | 1.32-1.46 | 0.35-0.40 | 0.097-0.30 | 0.15 |

We claim:

1. A device for detecting optical radiation, comprising:

a lens array of at least one Fresnel lens in a first plane, each member of said array having a common predetermined focal length at a predetermined wavelength different from the other members, disposed on a first surface of said device, for intercepting optical radiation and focusing said intercepted optical radiation to an array of focal spots; and a detecting film disposed parallel to said array of at least one Fresnel lens, said detecting film disposed in a second plane separated from said first plane by said predetermined focal length and being formed from a predetermined material having a predetermined damage threshold for optical radiation wherein radiation emitted from said lens array carrying a sample intensity level exceeding said predetermined damage threshold for a certain dwell time.

2. A device according to claim 1, in which first, second and third lenses focus radiation of a first wavelength, radiation of a second wavelength that is shorter than said first wavelength, and radiation of a third wavelength that is longer than said first wavelength, to said second plane.

3. A device according to claim 1, in which said at least one Fresnel lens is a phase plate.

4. A device according to claim 1, in which a backing plate for supporting said film is disposed on a front side of said film oriented toward said lens array and said backing plate contains an array of recesses formed therein at predetermined locations corresponding to said array of focal spots; and said backing plate further includes pressure relief means for permitting pressure in said array of recesses to equalize with ambient pressure.

5. A device according to claim 4, in which said backing plate includes a plurality of grooves in said front side thereof to form said pressure relief means.

6. A device according to claim 4, in which said film includes at least one porous portion thereof in communication with said array of recesses to form said pressure relief means.

7. A device for detecting optical radiation, comprising:

a Fresnel lens disposed in a first plane, said lens having a predetermined focal length at a predetermined wavelength, disposed on a first surface of said device, for intercepting optical radiation and focusing said intercepted optical radiation to a focal spot; and a spatial aperture disposed in a second plane separated from said first plane by said predetermined focal length and aligned with said lens such that radiation focused at said second plane by said lens passes through said spatial aperture;

an optical detector positioned behind said spatial aperture for generating a signal in response to radiation passing through said spatial aperture; and signal processing means connected to said optical detector for processing said signal therefrom.

8. A device according to claim 7, in which said signal processing means includes at least one circuit for responding to a signal magnitude above some threshold value.

9. A device according to claim 7, in which said Fresnel lens said spatial aperture, and optical detector comprise at least two units and said signal processing means includes means for comparing signals from said at least two units to generate therefrom a signal indicative of the unit having the greater amount of radiation passing through the spatial aperture thereof.

* * * * *